Patented Oct. 6, 1936

2,056,299

UNITED STATES PATENT OFFICE 2,056,299

DERIVATIVES OF HYDROQUINONE

Wilfred Archibald Sexton, Blackley, England, assignor to Imperial Chemical Industries Limited, a corporation of Great Britain No Drawing. Application March 19, 1934, Serial No. 716,425. In Great Britain March 27, 1933

18 Claims. (Cl. 260—124)

This invention relates to the manufacture of new derivatives of hydroquinone. More particularly, it deals with hydroquinone di-($\beta$-alkoxyethyl)-ethers and amino and acylamino derivatives thereof. My novel compounds may be represented by the general formula:

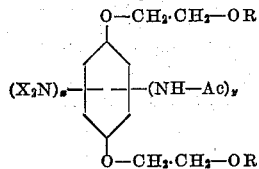

where $x$ stands for the numeral 0 or 1, $y$ stands for the numeral 0 or 1, R stands for an alkyl radical, Ac for an acyl radical, and X for hydrogen or oxygen. The new compounds may be used as intermediates in the synthesis of organic compounds. They are of particular interest in the manufacture of azo dyestuffs.

In my preferred mode of operation, I prepare my novel series of compounds by starting with hydroquinone and converting it progressively into a diether, a nitro derivative, an amine, etc. More particularly, I convert hydroquinone into a di($\beta$-alkoxyethyl)-ether by treating an alkali-metal salt of hydroquinone with a $\beta$-halogenoethylalkylether, for example, $\beta$-chloroethylethylether. I prepare the said amino derivatives by nitration followed by reduction of the above ethers. Acylamino derivatives are obtained by acylating the amino compounds, and these acylaminohydroquinone dialkoxyethylethers may be nitrated and reduced to give amino-acylamino-hydroquinone-di(alkoxyethyl)-ethers.

The invention is illustrated, but not limited, by the following examples, in which the parts are by weight.

EXAMPLE 1.—HYDROQUINONE-DI($\beta$-ETHOXYETHYL)-ETHER 72 parts of sodium hydroxide are dissolved in 640 parts of ethyl alcohol. A solution of 99 parts of hydroquinone in 160 parts of alcohol is added, followed by 205 parts of $\beta$-chloroethylethylether. The whole is boiled gently under reflux for 48 hours. The alcohol is removed by distillation and the residue poured into ice cold water, and stirred until the precipitated oil solidifies. The solid is then filtered off, washed with a little ice water and finally distilled in vacuum.

A white crystalline solid is obtained in good yield. It has a setting point of 34–35° C.; a boiling point of 210–212° C. at an absolute pressure of 25 mm.

EXAMPLE 2.—AMINOHYDROQUINONE-DI($\beta$-ETHOXYETHYL)-ETHER (a) Nitration 85 parts of the hydroquinone-di($\beta$-ethoxyethyl) ether prepared as in Example 1 are dissolved in 255 parts of glacial acetic acid at 15° C. A mixture of 23.5 parts of 94% nitric acid with 75 parts acetic acid is run in with agitation during 1 hour, the temperature being maintained at 12–15° C. The mixture is stirred finally for 2 hours to complete the reaction and is then poured into 1000 parts of cold water. The nitro compound separates as a dark oil in practically quantitative yield. It is purified by washing with water.

(b) Reduction 670 parts of water, 133 parts of iron and 8 parts of 36% hydrochloric acid are agitated together at 80° C. for 15 minutes. The nitro compound described above is added and the whole boiled with good agitation under reflux for 24 hours. At the end of this time the reduction mixture is made alkaline by addition of caustic soda, cooled to 90° C. and treated with 300 parts of toluene. The mixture is then filtered from the iron oxide sludge and the sludge washed with a further 300 parts of toluene. The toluene layer in the filtrate is separated, dried over calcium chloride and treated with dry hydrogen chloride until saturated. The amine hydrochloride separates in the form of grey crystals in good yield.

Basification of the hydrochloride with soda ash gives the amine, which is a white crystalline solid, setting point 40° C., B. P. 234°/12 mm.

EXAMPLE 3.—BENZOYLAMINOHYDROQUINONE-DI($\beta$-ETHOXYETHYL)-ETHER 31 parts of the amino compound described in Example 2 are dissolved in 62 parts of pyridine, and 14 parts of benzoyl chloride are added. The temperature rises to 60° C. The mixture is then heated for 5 hours at 110° C., poured into a mixture of 800 parts of water with 120 parts of 36% hydrochloric acid, and stirred until the precipitated oil solidifies. The benzoylamino compound thus obtained is purified by washing with dilute hydrochloric acid, and if desired may be recrystallized from ligroin. It has a M. P. of 60–61° C.

EXAMPLE 4.—2 - AMINO-5-BENZOYLAMINO - HYDROQUINONE-DI (β-ETHOXYETHYL)-ETHER (a) *Nitration*

33 parts of the benzoylamino compound described in Example 3 are dissolved in 99 parts of acetic acid below 20° C. A mixture of 6.2 parts of 94% nitric acid and 20 parts of acetic acid is run in during half an hour at 16–20° C. The nitro compound separates as a yellow solid. The mixture is stirred half an hour to complete the reaction; then, the nitro compound is filtered, washed free from acetic acid and dried. It has a M. P. of 115° C. A further quantity is obtained by pouring the acetic acid filtrate into water, making a total yield of over 90% of the theoretical.

(b) *Reduction*

50 parts of iron, 400 parts of water and 4 parts of 36% hydrochloric acid are agitated at 80° C. for 15 minutes. 34 parts of the above nitro product are now added and the whole is boiled gently under reflux with good agitation for 15 hours. The reduction product is extracted by means of hot toluene as in Example 2. In this case it is not necessary to pass in hydrogen chloride, for the free amine crystallizes out when the toluene extract is cooled. It has a M. P. of 114–115° C., and may be recrystallized from alcohol to give a M. P. of 115° C. The yield is good.

It will be understood that my process of operation may be varied within the full range of experience accumulated in the art in processes of this nature. My invention should therefore not be construed as limited to any special mode of operation, except as defined by the following claims.

I claim:

1. A diether of hydroquinone selected from the group consisting of di-β-alkoxyethyl-ether of hydroquinone, amino derivatives of the same compound, and acylated derivatives of the latter.

2. A diether of hydroquinone selected from the group consisting of di-β-ethoxyethyl-ether of hydroquinone, amino derivatives of the same compound, and acylated derivatives of the latter.

3. Amino - aroylamino - hydroquinone - di(β - alkoxyethyl) ether.

4. Amino - benzoylamino - hydroquinone-di(β - ethoxyethyl) ether.

5. Amino - hydroquinone - di(β - alkoxyethyl) - ether.

6. Amino - hydroquinone - di(β - ethoxyethyl) - ether.

7. A di(β-alkoxyethyl) ether of hydroquinone.

8. The di(β-ethoxyethyl) ether of hydroquinone.

9. The process of producing a derivative of hydroquinone, which comprises converting hydroquinone into its di(β-alkoxyethyl) ether, nitrating the compound thus obtained, reducing, acylating, further nitrating, and reducing to produce an amino-acylamino derivative of di(β-alkoxyethoxy)-hydroquinone.

10. The process of producing a derivative of hydroquinone, which comprises converting hydroquinone into its di(β-alkoxyethyl) ether, nitrating the compound thus obtained, reducing and acylating to produce an aroyl-amino derivative of di(β-alkoxyethoxy)-hydroquinone.

11. The process of producing a derivative of hydroquinone, which comprises nitrating a di(β-alkoxyethyl) ether of hydroquinone.

12. The process of producing a derivative of hydroquinone, which comprises alkylating hydroquinone with an ester of β-alkoxy-ethyl alcohol, to produce a di(β-alkoxy-ethyl) ether of hydroquinone.

13. The process of producing a derivative of hydroquinone, which comprises reacting an alkali-metal salt of hydroquinone with a β-halogeno-ethyl-alkyl ether, whereby to produce the di(β-alkoxyethyl) ether of hydroquinone.

14. The process of producing a derivative of hydroquinone, which comprises reacting the disodium salt of hydroquinone with β-chloro-ethyl-ethyl-ether.

15. The process of producing a di-ether of hydroquinone which comprises refluxing a mixture of sodium hydroxide, ethyl alcohol, hydroquinone, and β-chloro-ethyl-ethyl-ether, and recovering the oily reaction product.

16. A compound of the general formula

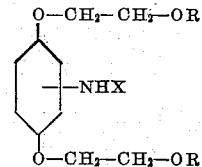

wherein X stands for hydrogen or an acyl radical, and R stands for an alkyl radical.

17. A compound of the general formula

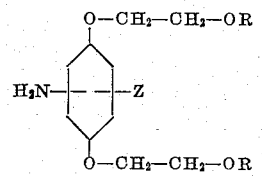

wherein Z stands for hydrogen or an acylamino group, and R stands for an alkyl radical.

18. A di(β-alkoxyethyl) ether of hydroquinone substituted in the nucleus by at least one nitrogenous radical of the group consisting of primary amines and acylamines.

WILFRED ARCHIBALD SEXTON.